(12) United States Patent
He et al.

(10) Patent No.: US 11,866,673 B2
(45) Date of Patent: Jan. 9, 2024

(54) ULTRASONIC-ASSISTED HEAT PRESS MACHINE AND USES THEREOF

(71) Applicant: Henan Agricultural University, Zhengzhou (CN)

(72) Inventors: Chao He, Zhengzhou (CN); Hui Zhang, Zhengzhou (CN); Liang Liu, Zhengzhou (CN); Youzhou Jiao, Zhengzhou (CN); Mingming Lan, Zhengzhou (CN); Gang Li, Zhengzhou (CN); Xiaohui Pan, Zhengzhou (CN); Xinxin Liu, Zhengzhou (CN); Yawei Wang, Zhengzhou (CN); Guizhuan Xu, Zhengzhou (CN); Xiaoran Ma, Zhengzhou (CN); Huan Zhang, Zhengzhou (CN)

(73) Assignee: HENAN AGRICULTURAL UNIVERSITY, Zhengzhou (CN)

( * ) Notice: Subject to any disclaimer, the term of this patent is extended or adjusted under 35 U.S.C. 154(b) by 14 days.

(21) Appl. No.: 17/749,121

(22) Filed: May 19, 2022

(65) Prior Publication Data
US 2023/0094387 A1    Mar. 30, 2023

(30) Foreign Application Priority Data

Sep. 26, 2021   (CN) .......................... 202111132365.6

(51) Int. Cl.
| | | |
|---|---|---|
| *C11B 1/10* | (2006.01) | |
| *A23D 9/02* | (2006.01) | |
| *B30B 9/06* | (2006.01) | |
| *B30B 15/34* | (2006.01) | |

(52) U.S. Cl.
CPC ................ *C11B 1/106* (2013.01); *A23D 9/02* (2013.01); *B30B 9/062* (2013.01); *B30B 15/34* (2013.01)

(58) Field of Classification Search
CPC   B30B 9/06; B30B 9/062; B30B 15/34; C11B 1/02; C11B 3/008; C11B 1/08; C11B 3/005; A23D 9/02; A23V 2002/00; A23V 2300/48
USPC ........................................................ 99/495
See application file for complete search history.

(56) References Cited

U.S. PATENT DOCUMENTS

| | | | | |
|---|---|---|---|---|
| 4,918,989 A | * | 4/1990 | Desruelles | ......... G01N 29/4463 73/637 |
| 6,231,834 B1 | * | 5/2001 | Unger | ...................... B82Y 5/00 600/431 |
| 2006/0057487 A1 | * | 3/2006 | Nagayama | ............. G03G 9/113 430/111.32 |

(Continued)

*Primary Examiner* — Eric S Stapleton
(74) *Attorney, Agent, or Firm* — MATTHIAS SCHOLL P.C.; Matthias Scholl (57) ABSTRACT

An ultrasonic-assisted heat press machine, includes a frame, a material tank, an extruder, an ultrasonic wave generator, and a heater. The material tank is disposed on the frame and includes a cavity for accommodating an oil-bearing raw material. The extruder is extended in the cavity. The ultrasonic wave generator is disposed on the frame and adjacent to the material tank. The heater is disposed on the frame and adjacent to the material tank. The heater is configured to produce heat to heat the cavity and the ultrasonic wave generator, and regulate the working frequency of the ultrasonic wave generator. When in use, the heater, the extruder, and the ultrasonic wave generator cooperate to separate oil from the oil-bearing raw material in the material tank.

11 Claims, 10 Drawing Sheets

(56) References Cited

U.S. PATENT DOCUMENTS

| | | | | |
|---|---|---|---|---|
| 2010/0210745 A1* | 8/2010 | McDaniel | ............... | C09D 7/48 |
| | | | | 521/55 |
| 2011/0240064 A1* | 10/2011 | Wales | ..................... | C09D 7/65 |
| | | | | 428/116 |
| 2011/0250626 A1* | 10/2011 | Williams | ................ | C12Q 1/34 |
| | | | | 106/4 |
| 2012/0097194 A1* | 4/2012 | McDaniel | ............. | A01N 63/50 |
| | | | | 435/197 |
| 2017/0288298 A1* | 10/2017 | Kim | .................... | H04B 1/3818 |

\* cited by examiner

ULTRASONIC-ASSISTED HEAT PRESS MACHINE AND USES THEREOF

CROSS-REFERENCE TO RELATED APPLICATIONS

Pursuant to 35 U.S.C. § 119 and the Paris Convention Treaty, this application claims foreign priority to Chinese Patent Application No. 202111132365.6 filed Sep. 26, 2021, the contents of which, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, MA 02142.

BACKGROUND

The disclosure relates to the extraction of animal oil from an oil-bearing material, and more particularly, to an ultrasonic-assisted heat press machine and uses thereof.

The screw extruder is used as a tool to extract the animal oil from an oil-bearing material. A conventional animal oil extraction process includes: pretreating the oil-bearing material to obtain the animal oil and the oil residue; and extruding the oil residue to separate the remaining animal oil from the residue. The extrusion process involves a screw extruder to push the oil-bearing material in a cylindrical barrel. The screw extruder is easy to wear out, and the addition amount of the oil residue is difficult to control. Overloaded oil residues will increase the frictional resistance of the screw extruder, and thus leads to incomplete extrusion.

SUMMARY

To solve the aforesaid problems, the first objective of the disclosure is to provide an ultrasonic-assisted heat press machine, comprising a frame, a material tank, an extruder, an ultrasonic wave generator, and a heater; the material tank is disposed on the frame and comprises a cavity for accommodating an oil-bearing raw material; the extruder is extended in the cavity; the ultrasonic wave generator is disposed on the frame and adjacent to the material tank; the heater is disposed on the frame and adjacent to the material tank. The heater is configured to produce heat to heat the cavity and the ultrasonic wave generator, and regulate the working frequency of the ultrasonic wave generator. When in use, the heater, the extruder, and the ultrasonic wave generator cooperate to separate oil from the oil-bearing raw material in the material tank.

In a class of this embodiment, the material tank is disposed above the frame; and the heater is disposed between the material tank and the frame to reduce heat loss, thus saving energy and improving the oil extraction efficiency.

In a class of this embodiment, the ultrasonic-assisted heat press machine further comprises a filter assembly disposed on the frame; and the material tank comprises a pulp outlet adjacent to the filter assembly. The filter assembly is configured to filter out the oil residues, and is adjacent to the pulp outlet to minimize oil loss, thus increasing the oil extraction efficiency.

In a class of this embodiment, the filter assembly comprises a filter screen and a deflector; the filter screen is disposed on the frame and adjacent to the pulp outlet so as to filter out oil residues; and the deflector is disposed beneath the filter screen to guide the oil extracted from the oil-bearing raw material. The filter assembly is a double-layer structure that filters out the oil residue, so that the residue is left on the filter assembly and the animal oil flows through the filter assembly into the oil collector to increase the oil extraction efficiency.

In a class of this embodiment, the material tank comprises a bottom portion and a corrugated structure disposed on the bottom portion; and the corrugated structure is configured to increase the efficiency of the extrusion and extraction.

In a class of this embodiment, the ultrasonic-assisted heat press machine comprises a support frame; the support frame comprises at least two vertical beams and a horizontal beam; the at least two vertical beams are disposed on the frame and symmetrically on both sides of the material tank; the horizontal beam comprises a through hole; both ends of the horizontal beam are connected to the at least two vertical beams, respectively; and the extruder is disposed through the through hole and fixedly disposed on the support frame.

In a class of this embodiment, the ultrasonic-assisted heat press machine comprises at least two ultrasonic wave generators; the two vertical beams are symmetrically disposed on both sides of the material tank; and the two ultrasonic wave generators are symmetrically disposed on both sides of the material tank to increase the efficiency of the oil extraction from the oil-bearing raw material.

In a class of this embodiment, the extruder comprises an extrusion part on one end facing the material tank; and the extrusion part comprises a protrusion thus increasing the contact area with the oil-bearing raw material in the material tank, thus reducing oil loss and increasing the extrusion efficiency.

In a class of this embodiment, the ultrasonic-assisted heat press machine further comprises an oil collector disposed on the frame; the oil collector comprises a hole communicating with the oil collector; and the animal oil can flow through the hole into the oil collector.

The second objective of the disclosure is to provide a method for extracting an animal oil from an oil-bearing raw material by using the ultrasonic-assisted heat press machine, the method comprising:

S10. adding the oil-bearing raw material to the material tank;

S20. turning on the heater to heat the material tank, so that oil is extracted from the oil-bearing raw material under the cooperation of the heater and the ultrasonic wave generator;

S30. turning on the driving assembly to drive the extruder to press the oil-bearing raw material in the material tank; and S40. guiding the oil through the filter assembly into the oil collector.

Preferably, in S10 and S20, the animal oil is extracted from the oil-bearing raw material with the heater and the ultrasonic wave generator; in S30 and S40, the animal oil flows through the pulp outlet and the filter assembly consecutively, and are guided into the oil collector.

The following advantages are associated with the ultrasonic-assisted heat press machine and uses thereof:

1. The heater regulates the working frequency of the ultrasonic wave generator thus increasing the efficiency of the oil extraction from the oil-bearing raw material;

2. The filter assembly filters out the oil residue thus improving the quality of the oil; and 3. The filter assembly is a double-layer structure configured to filter out the oil residue and allow the animal oil to flow into the oil collector, thus increasing the oil extraction efficiency.

In the drawings, the following reference numbers are used: 10. Frame; 11. Mounting base; 12. Installation part; 14. Hole; 20. Material tank; 21. Pulp outlet; 22. Corrugated structure; 23. Cavity; 24. Opening; 30. Extruder; 31. Hydraulic cylinder; 32. Hydraulic piston rod; 33. Extrusion part; 331. Protrusion; 40. Oil collector; 41. Oil outlet; 50. Ultrasonic wave generator; 60. Support frame; 61. Vertical beam; 62. Horizontal beam; 70. Filter assembly; 71. Filter screen; 72. Deflector; 80. Driving assembly; 90. Heater; and 100. Ultrasonic-assisted heat press machine.

DETAILED DESCRIPTION

To further illustrate the disclosure, embodiments detailing an ultrasonic-assisted heat press machine and uses thereof are described below. It should be noted that the following embodiments are intended to describe and not to limit the disclosure.

EXAMPLE 1

As shown in FIGS. 1-4, an ultrasonic-assisted heat press machine 100 comprises a frame 10, a material tank 20, an extruder 30, an ultrasonic wave generator 50, and a heater 90. The material tank 20 and the heater 90 are disposed on the frame 10. The extruder 30 is connected to the material tank 20. The ultrasonic wave generator 50 is disposed on the frame 10 and adjacent to the material tank 20. The material tank 20 is configured to receive an oil-bearing raw material. The heater 90 is configured to transfer heat to the material tank 20 and the ultrasonic wave generator 50 consecutively, thus regulating the working frequency of the ultrasonic wave generator 50. The animal oil is extracted from the oil-bearing raw material with the heater 90 and the ultrasonic wave generator 50, and extruded out by the extruder 30.

Understandably, the ultrasonic wave can accelerate destruction of protein during animal oil extraction. In this example, the ultrasonic wave generator 50 is configured to provide the ultrasonic wave for fast animal oil extraction. Optionally, the ultrasonic wave generator 50 is an ultrasonic transducer. In certain examples, two ultrasonic transducers are disposed symmetrically on both sides of the material tank 20. In certain examples, multiple ultrasonic transducers are disposed around the material tank 20. Understandably, the number of the ultrasonic transducer is determined by demand.

Preferably, the frame 10 comprises a mounting base 11 and an installation part 12 disposed on the mounting base 11. The heater 90 is disposed at the installation part 12. The material tank 20 is disposed above the heater 90. One end of the extruder 30 is disposed in the material tank 20, and another end of the extruder 30 is exposed outside the material tank 20. The extruder 30 is configured to press the oil-bearing raw material to provide the manila oils.

Further, the heater 90 may be a resistance wire for improving the heating efficiency of the heater 90. The installation part 12 may be in the form of a recess disposed on the mounting base 11. The resistance wire is disposed in the recess, and the material tank 20 is disposed above the recess, so that the material tank 20 can be heated by the resistance wire. Understandably, to prevent heat loss, an area of the recess is smaller than that of the base area of the material tank 20. A sealing effect is achieved when the recess is covered by the material tank 20. Understandably, the heater 90 may further comprise other heating components. When the heater 90 is the resistance wire, the electric power is supplied to the ultrasonic-assisted heat press machine 100, and the resistance wire is energized to heat the material tank 20.

Preferably, the ultrasonic-assisted heat press machine 100 further comprises an oil collector 40 disposed on the frame 10 and under the mounting base 11. The oil collector 40 is configured to collect the animal oil extracted from the oil-bearing raw material. The oil collector 40 comprises an oil outlet 41 from which the animal oil can be taken out. In certain examples, the oil outlet 41 is in the form of a drawer; in use, a user grabs a front ring or handle of the drawer and extends it outward; when the drawer is opened, the user takes the animal oil out. Optionally, the frame 10 comprises a cover plate, and the oil outlet 41 is in the form of an opening disposed on one side of the oil collector 40; the cover plate is covered on the oil outlet 41 to prevent the animal oil from flowing out of the oil collector 40, and the cover plate can be removed to allow the animal oil to flow out of the oil collector 40. In certain examples, the oil outlet 41 is disposed on the bottom part of the oil collector 40. Understandably, the animal oil is, but are not limited to, taken out by the methods herein.

Preferably, the bottom part of the material tank 20 comprises a pulp outlet 21 through which the oil-bearing raw material is added to the material tank 20 for oil extraction. The mounting base 11 comprises a hole 14 communicating with the oil collector 40. The pulp outlet 21 is disposed at the hole 14 so that the animal oil can flow through the hole 14 into the oil collector 40.

Figure 1:
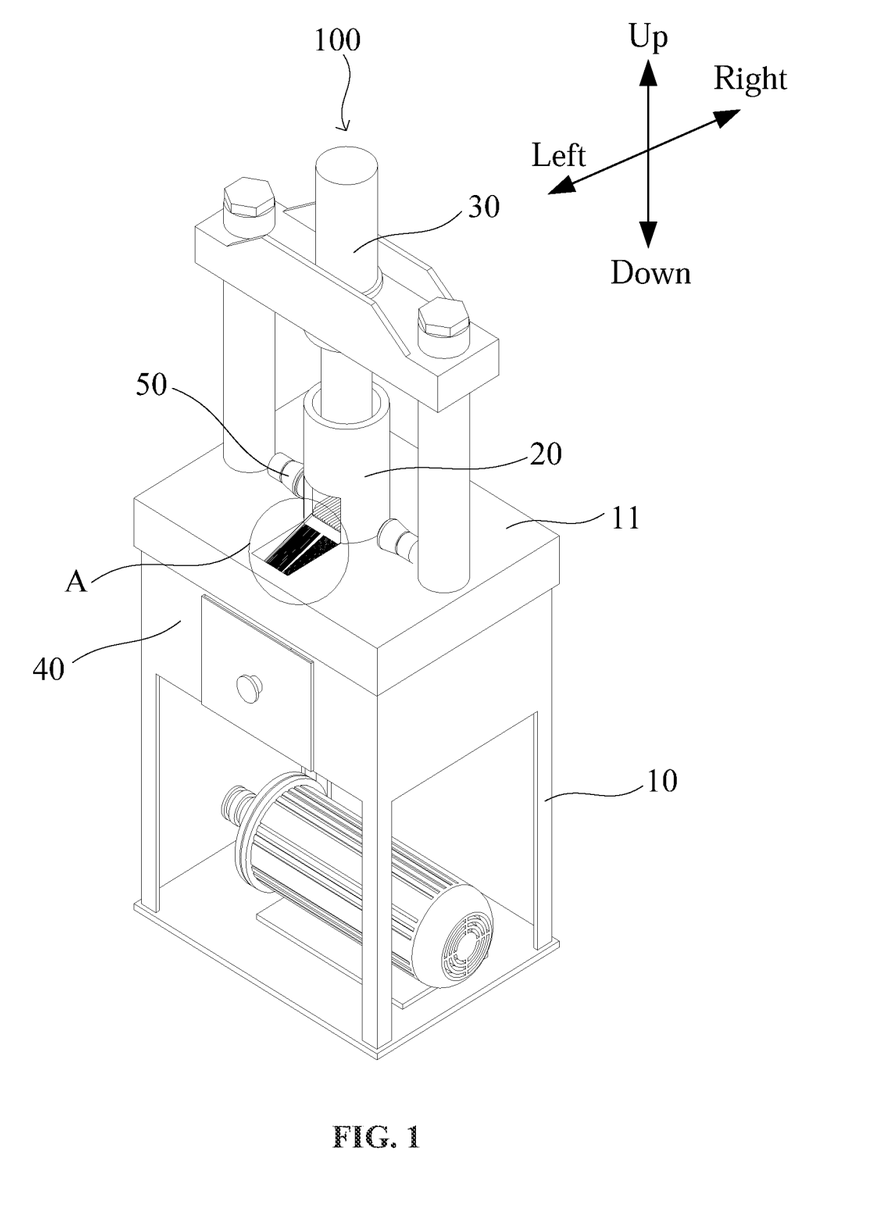
FIG. 1 is a perspective view of an ultrasonic-assisted heat press machine according to Example 1 of the disclosure.
Figure 2:
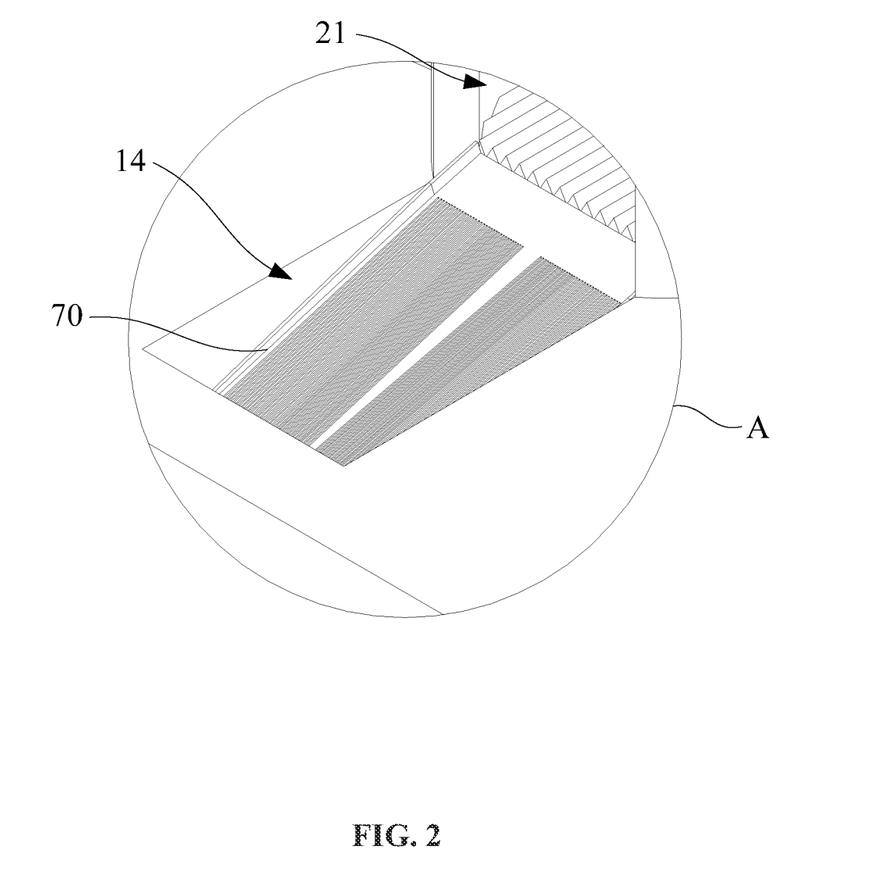
FIG. 2 is a local enlarged view of part A in FIG. 1.
Figure 3:
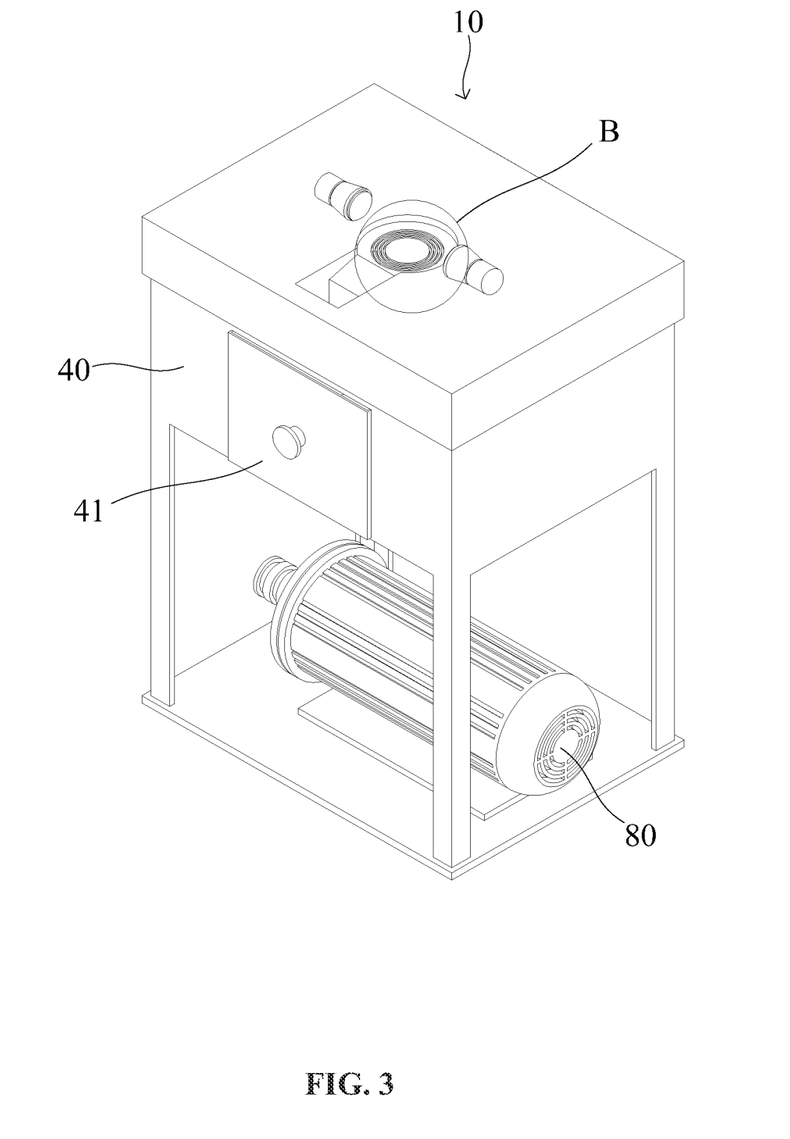
FIG. 3 is a perspective view of a frame in FIG. 1.
Figure 4:
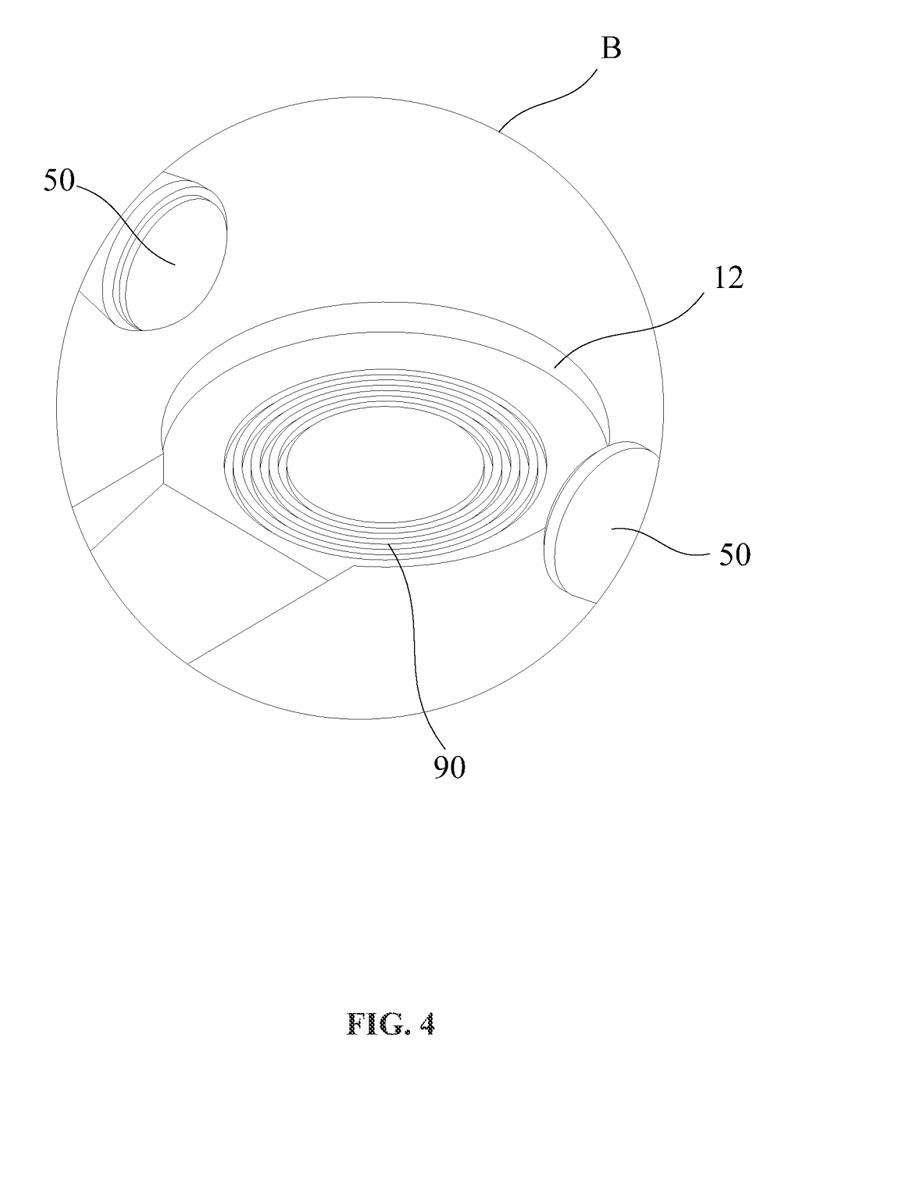
FIG. 4 is a local enlarged view of part B in FIG. 3.
Figure 5:
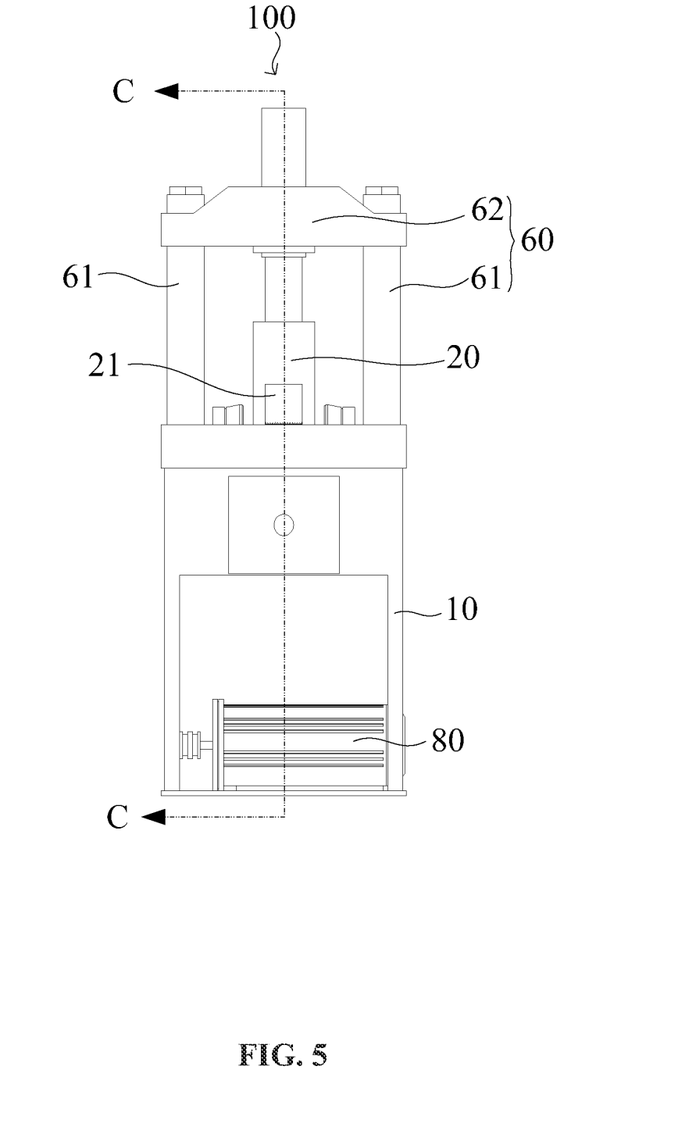
FIG. 5 is a front view of the ultrasonic-assisted heat press machine in FIG. 1.
Figure 6:
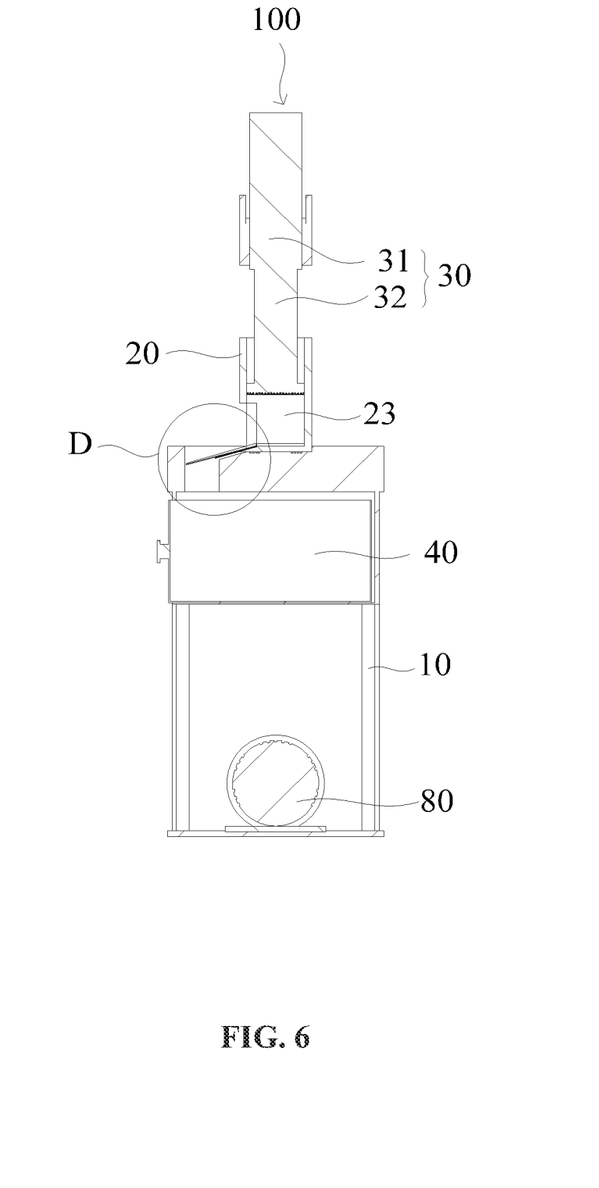
FIG. 6 is a sectional view taken from line C-C in FIG. 5.

Preferably, as shown in FIGS. 5 and 6, the ultrasonic-assisted heat press machine 100 further comprises a support frame 60 disposed on the frame 10 and used to fix the extruder 30 in place. The support frame 60 comprises a horizontal beam and at least two vertical beams 61. The at least two vertical beams are disposed on the mounting base 11. In certain examples, the ultrasonic-assisted heat press machine 100 further comprises two vertical beams 61 and two ultrasonic wave generators 50; the two vertical beams 61 are symmetrically disposed on both sides of the material tank 20; and the two ultrasonic wave generators 50 are symmetrically disposed on both sides of the material tank 20. Both ends of the horizontal beam 62 are connected to the two vertical beams, respectively. The horizontal beam 62 comprises a through hole (not shown). One end of the extruder 30 is disposed in the material tank 20, and another end of the extruder is disposed through the through hole. The horizontal beam 62 is secured to the two vertical beams by any suitable connection means such as thread screws, snap fasteners, rotary connection units, or the horizontal beam 62 is integrated with the two vertical beams. Understandably, the number of the horizontal beam 62 and the vertical beam 61 is determined by demand.

In certain examples, the extruder 30 is a hydraulic device, and the ultrasonic-assisted heat press machine 100 further comprises a driving assembly 80 disposed on the frame 10 and below the oil collector 40; the driving assembly 80 is connected to and drives the extruder thus improving the oil extraction efficiency.

Further, the material tank 20 comprises a cavity 23 for accommodating the oil-bearing raw material. The oil-bearing raw material and one end of the extruder 30 are disposed in the cavity 23. The extruder 30 is configured to move up and down in the material tank 20 so as to press the oil-bearing raw material to provide the animal oil.

Figure 7:
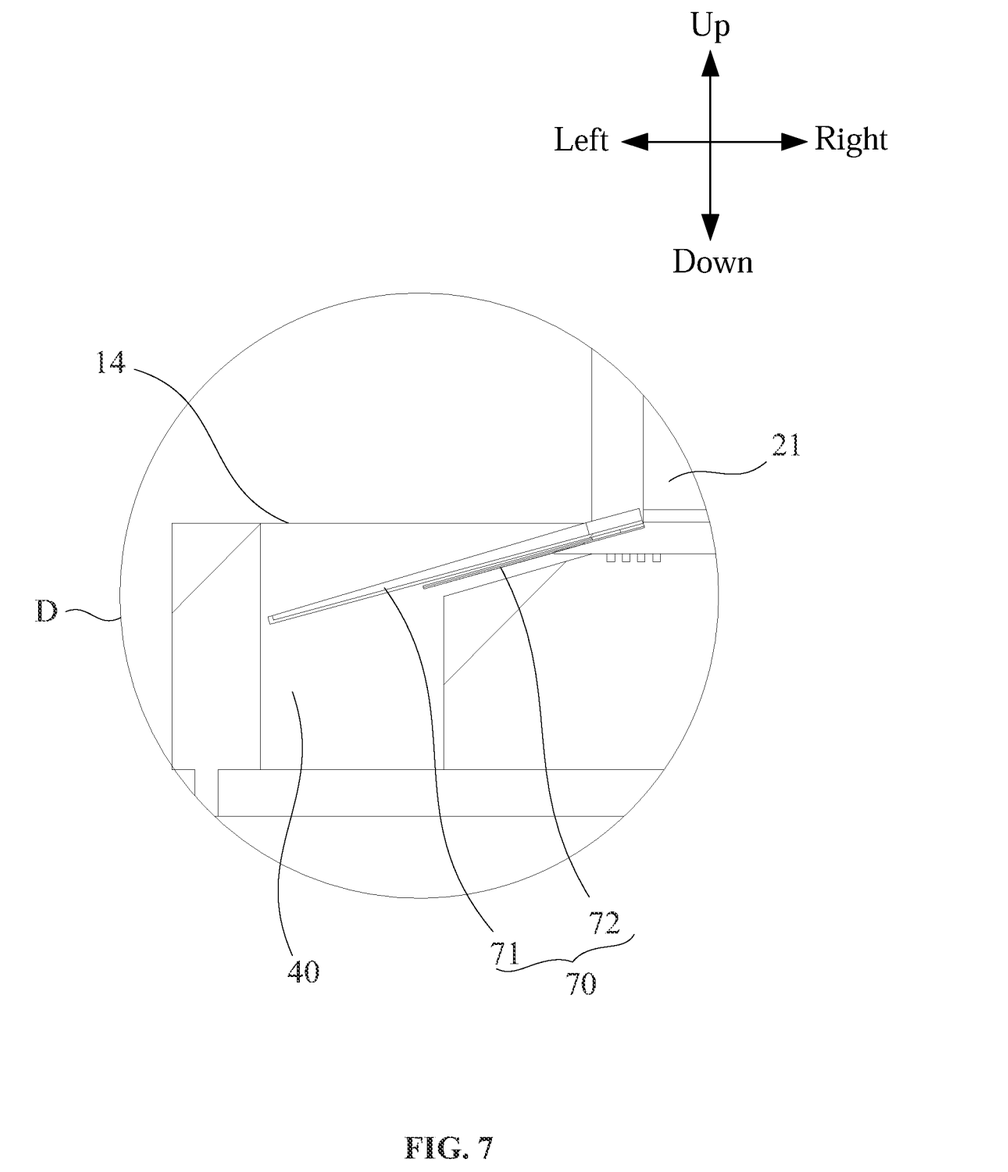
FIG. 7 is a local enlarged view of part D in FIG. 6.

Preferably, referring to FIGS. 6 and 7, the ultrasonic-assisted heat press machine 100 further comprises a filter assembly 70 disposed between the pulp outlet 21 and the hole 14. The filter assembly 70 is configured to filter out the oil residues, so that the residue is left on the filter assembly and the animal oil flows through the filter assembly into the oil collector. Understandably, to ensure the animal oil flows smoothly from the material tank 20 into the oil collector 40, the filter assembly 70 is inclined relative to the horizontal and disposed at the hole 14 (as shown in FIG. 7).

Further, the filter assembly 70 is a double-layer structure, comprising a filter screen 71 and a deflector 72 disposed beneath the filter screen 71. The filter screen 71 is configured to filter out the oil residues. The deflector 72 is configured to direct oil flow, thus speeding up the separation of the animal oil from the residue. One end of the filter screen 71 is connected to the pulp outlet 21, and another end of the filter screen 71 abuts against the sidewall of the oil collector 40. The deflector 72 has a smaller length than the filter screen 71 to guide the oil extracted from the oil-bearing raw material. Understandably, the deflector 72 may be put into a corrugated shape.

Figure 8:
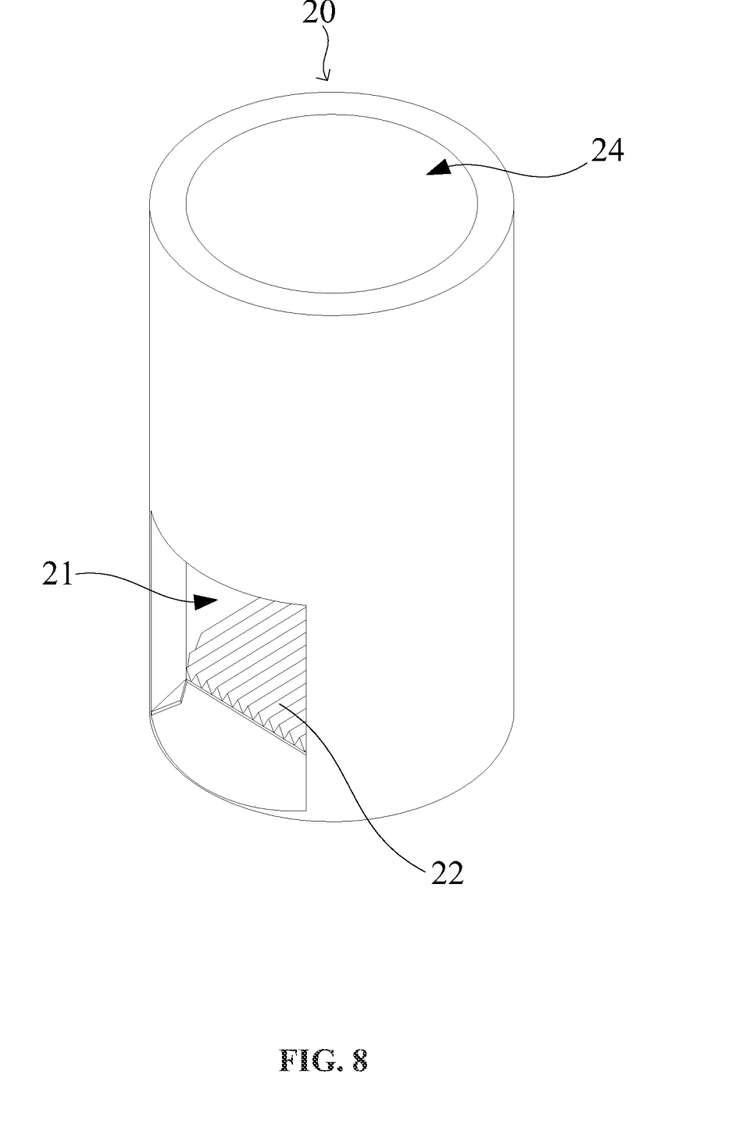
FIG. 8 is a perspective view of a material tank in FIG. 1.

Preferably, as shown in FIG. 8, the material tank 20 comprises an opening 24; the bottom end of the extruder 30 is disposed through the opening 24 into the material tank 20. Understandably, the material tank 20 comprises a bottom portion and a corrugated structure disposed on the bottom portion; and the corrugated structure is configured to increase the efficiency of the extrusion and extraction.

Preferably, as shown in FIGS. 5-10, the extruder 30 is a hydraulic device; the hydraulic device comprises a hydraulic cylinder 31 and a hydraulic piston rod 32; the hydraulic piston rod 32 slides up and down inside the hydraulic cylinder 31; the hydraulic piston rod 32 is extended in the cavity 23; and the hydraulic cylinder 31 is exposed outside the opening 24; the top end of the hydraulic cylinder 31 is disposed through the through hole, so that the hydraulic device is fixed on the support frame 60 to stop machine shaking, thus increasing the oil extrusion efficiency.

Figure 9:
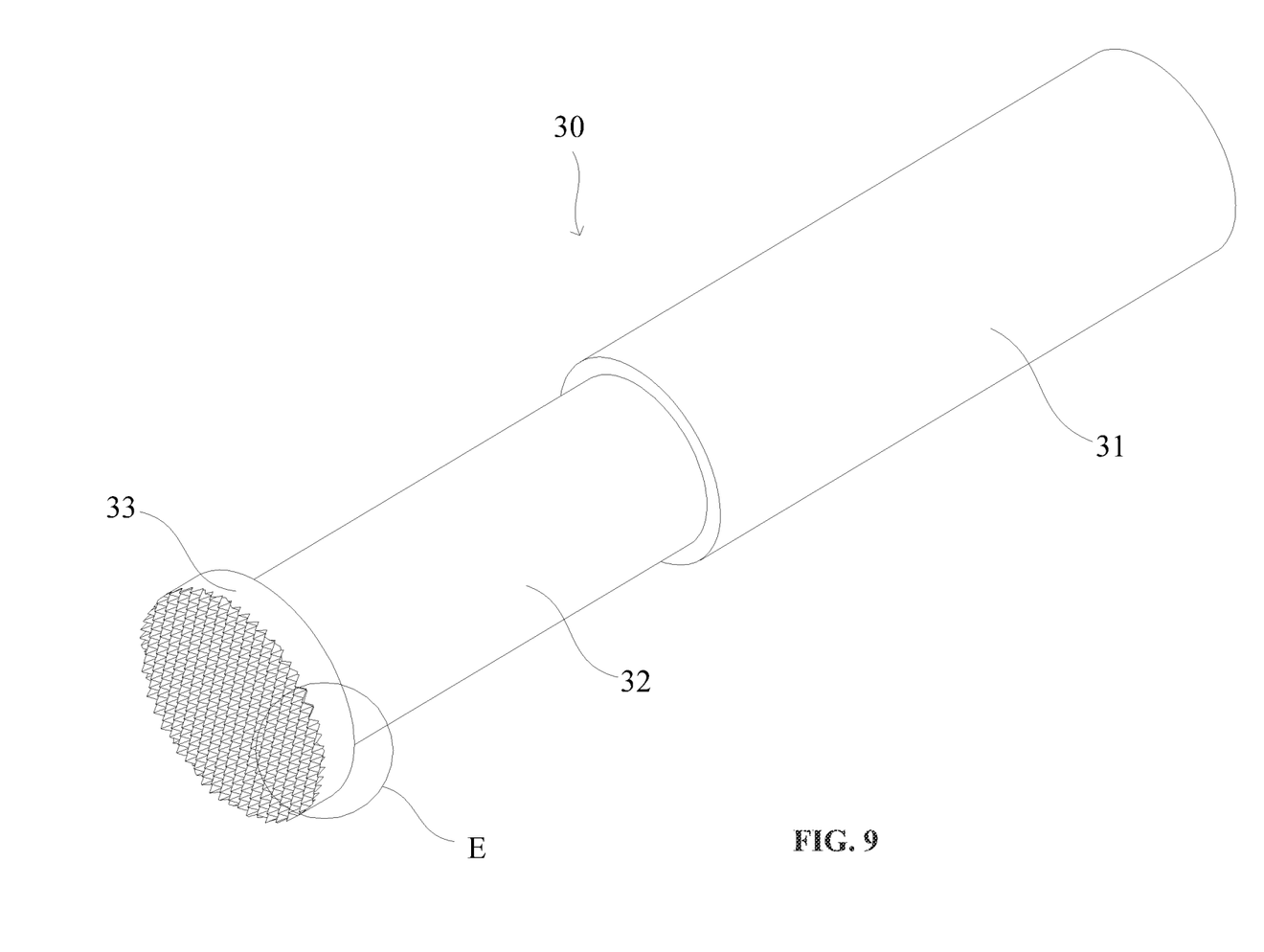
FIG. 9 is a perspective view of an extruder in FIG. 1.
Figure 10:
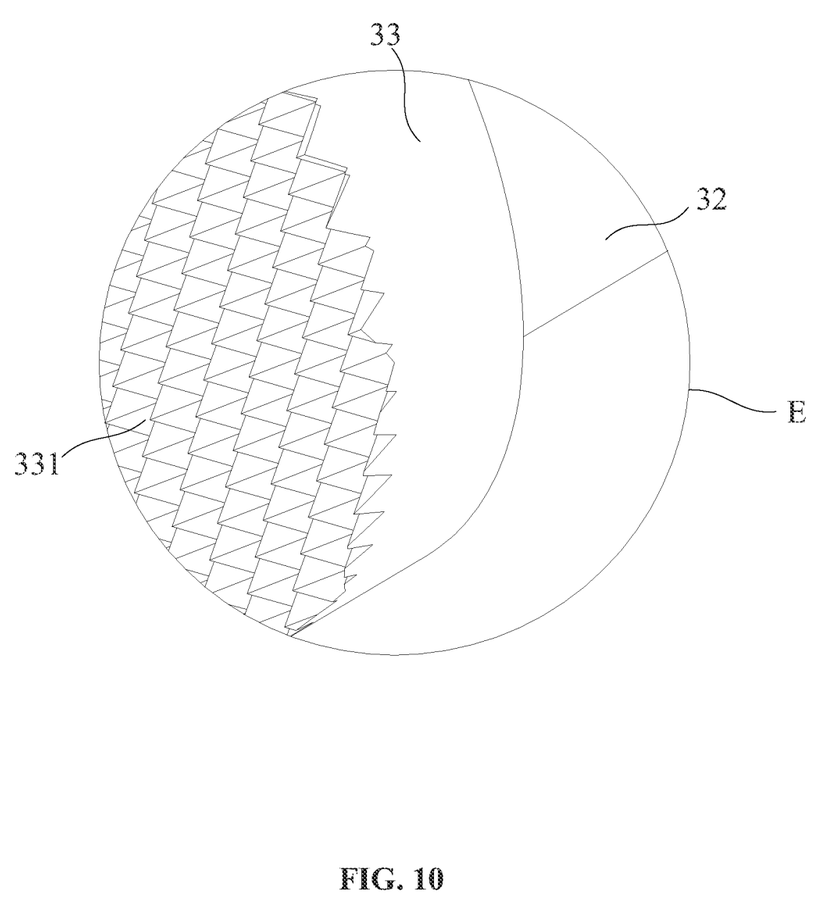
FIG. 10 is a local enlarged view of part E in FIG. 9.

Further, the hydraulic piston rod 32 comprises a distal end away from the hydraulic cylinder 31; and the distal end comprises an extrusion part 33. The extrusion part 33 comprises a distal end facing toward the bottom portion of the material tank 20, and the distal end comprises a protrusion 331 matched with the corrugated structure 22 in shape and size. The animal oil is extracted from the oil-bearing raw material with the cooperation of the protrusion 331 and the corrugated structure 22. The extrusion part 33 is in the form of a disc having the same base area as the material tank 20, which prevents the animal oil from being absorbed on the side surface of the material tank 20, thus reducing the oil loss and increasing the oil extraction efficiency.

EXAMPLE 2

A method for extracting the animal oil from the oil-bearing raw material by using the ultrasonic-assisted heat press machine 100, the method comprises:

S10. the oil-bearing raw material are added to the material tank 20;

S20. the heater 90 is turned on to heat the material tank 20; and the animal oil is extracted from the oil-bearing raw material with the operation of the heater 90 and the ultrasonic wave generator 50;

S30. the driving assembly 80 is turned on and drives the extruder 30 to press the oil-bearing raw material in the material tank 20; and S40. the animal oil is guided through the filter assembly 70 into the oil collector 40.

Preferably, in S10 and S20, prior to animal oil extraction, the oil-bearing raw material are added in the material tank 20 and the heater 90 is turned on to heat the material tank 20; the ultrasonic wave generator 50 is adjacent to the material tank 20, so that the heater 90 can indirectly regulate the working frequency of the ultrasonic wave generator 50; the animal oil is extracted from the oil-bearing raw material with the heater 90 and the ultrasonic wave generator 50.

Further, in S30 and S40, the animal oil flows through the pulp outlet 21 and the filter assembly 70 consecutively, and are guided into the oil collector 40.

Understandably, the disclosure combines several unit operations in one machine which extracts the animal oil from the oil-bearing raw material in a more efficient manner, thereby increasing the production of the animal oil.

It will be obvious to those skilled in the art that changes and modifications may be made, and therefore, the aim in the appended claims is to cover all such changes and modifications.

What is claimed is:

1. A device, comprising:
    a frame;
    a material tank;
    an extruder;
    an ultrasonic wave generator; and
    a heater;
   wherein:
    the material tank is disposed on the frame and comprises a cavity for accommodating an oil-bearing raw material;
    the extruder is extended in the cavity;
    the ultrasonic wave generator is disposed on the frame and adjacent to the material tank;
    the heater is disposed on the frame and adjacent to the material tank;
    the heater is configured to produce heat to heat the cavity and the ultrasonic wave generator, and regulate a working frequency of the ultrasonic wave generator; and
    when in use, the heater, the extruder, and the ultrasonic wave generator cooperate to separate oil from the oil-bearing raw material in the material tank.

2. The device of claim 1, wherein the material tank is disposed above the frame;
    and the heater is disposed between the material tank and the frame.

3. The device of claim 2, further comprising a filter assembly disposed on the frame; and the material tank comprising a pulp outlet adjacent to the filter assembly.

4. The device of claim 3, wherein the filter assembly comprises a filter screen and a deflector; the filter screen is disposed on the frame and adjacent to the pulp outlet to filter out oil residues; and the deflector is disposed beneath the filter screen to guide the oil extracted from the oil-bearing raw material.

5. The device of claim 4, wherein the material tank comprises a bottom portion and a corrugated structure disposed on the bottom portion.

6. The device of claim 1, further comprising a support frame; wherein the support frame comprises at least two vertical beams and a horizontal beam; the at least two vertical beams are disposed on the frame and symmetrically on both sides of the material tank; the horizontal beam comprises a through hole; both ends of the horizontal beam are connected to the at least two vertical beams, respectively; and the extruder is disposed through the through hole and fixedly disposed on the support frame.

7. The device of claim 6, comprising at least two ultrasonic wave generators; wherein two vertical beams are symmetrically disposed on both sides of the material tank; and the two ultrasonic wave generators are symmetrically disposed on both sides of the material tank.

8. The device of claim 1, wherein the extruder comprises an extrusion part on one end facing the material tank; and the extrusion part comprises a protrusion thus increasing a contact area with the oil-bearing raw material in the material tank.

9. The device of claim 4, further comprising an oil collector disposed on the frame; wherein the oil collector comprises a hole communicating with the pulp outlet of the material tank; and when in use, the oil extracted from the oil-bearing raw material flows through the pulp outlet and the hole consecutively into the oil collector.

10. The device of claim 1, further comprising a driving assembly disposed on the frame and below the oil collector; and the driving assembly is connected to the extruder.

11. A method for extracting an animal oil from an oil-bearing raw material by using the device of claim 1, the device further comprising a filter assembly disposed on the frame, and a driving assembly connected to the extruder and configured to drive the extruder to press the oil-bearing raw material in the material tank, the method comprising:
- adding the oil-bearing raw material to the material tank;
- turning on the heater to heat the material tank, so that animal oil is extracted from the oil-bearing raw material under the cooperation of the heater and the ultrasonic wave generator;
- turning on the driving assembly to drive the extruder to press the oil-bearing raw material in the material tank; and
- guiding the animal oil through the filter assembly into the oil collector.

* * * * *